United States Patent Office 2,958,609
Patented Nov. 1, 1960

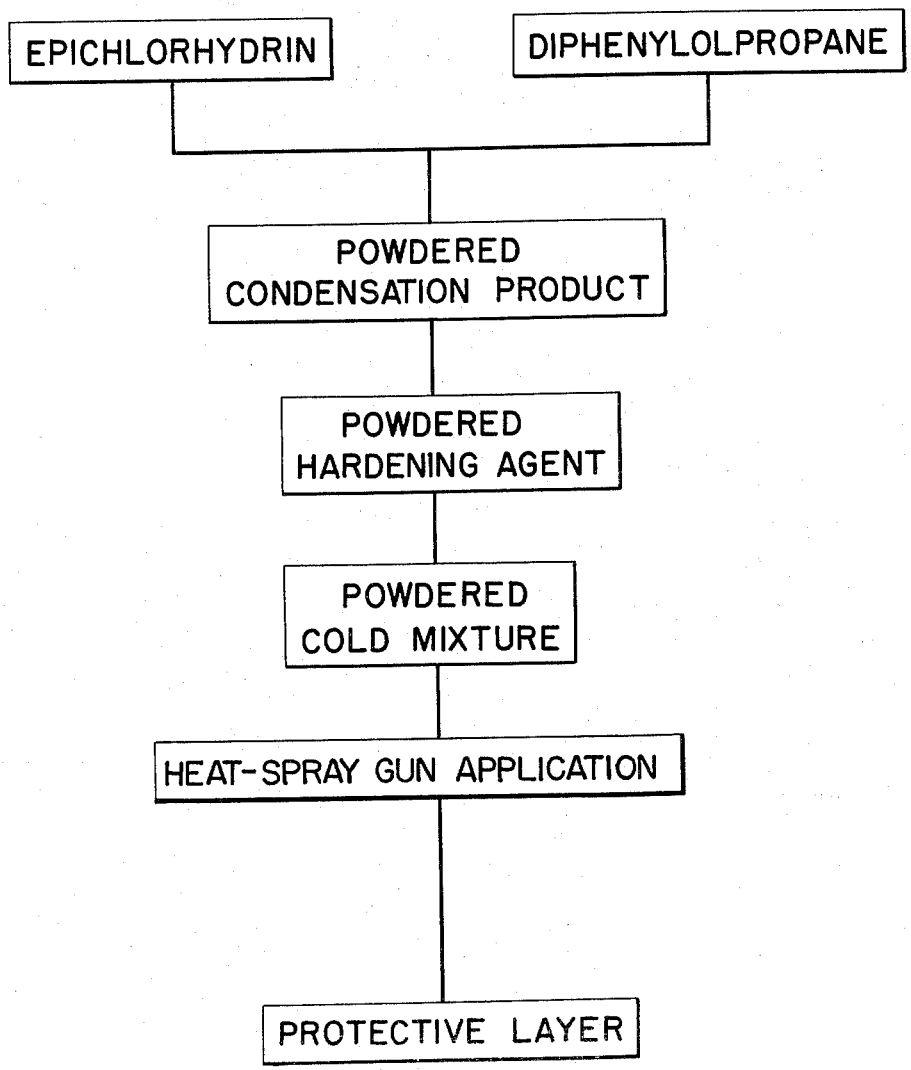

2,958,609
PROCESS FOR THE PREPARATION OF PROTECTIVE COATINGS

Otto Stoll, Munchingen-Kallenberg, and Gerhard Musshafen, Kornwestheim, Germany, assignors to Firma Paul Lechler, a limited-liability company of Stuttgart, Germany Filed June 25, 1957, Ser. No. 667,980

Claims priority, application Germany July 3, 1956

6 Claims. (Cl. 117—46)

This invention relates to a process of preparing protective coatings and coating materials.

Mixture of two or more components which produce cold-hardening, chemically resistant protective coatings, in spite of their advantages, have not been found to effect a wide degree of usefulness since their methods of application present certain difficulties. Mainly they must be delivered as separate components and only be mixed together by the final user who used the finished material. It is necessary that the mixtures be correctly proportioned, which does not always happen, for example, when the mixture must be made in a crude building work yard. Besides this drawback, these materials have another further disadvantage residing in the fact that the unused material becomes worthless upon hardening.

It is an object therefore of the present invention to provide a protective coating material which may be instantaneously produced at the place of application without encountering difficulties in apportioning the materials resulting in loss.

Still another object of the present invention is to produce a hardening state of the component mixtures within a relatively short period of heating time.

Another object of the present invention is to provide a greater degree of efficiency in the method of distribution and application of protective coating materials.

Yet a further object of the present invention is to provide a greater degree of flexibility and diversification in the application and usefulness of the novel protective constituents of the present invention.

Accordingly, broadly speaking, it is an object of the present invention to provide an improved protective coating material which is not subject to the disadvantages above-mentioned.

Other objects of the present invention will become more apparent during the course of the following specification.

In the attainment of the aforesaid objectives two or more component mixtures are reacted with each other in the presence of a suitable hardening agent. The mixture may be heated at any desired location by any usual methods available to those skilled in the art to effect immediate application of the material.

The reactive two or more component mixtures presently encountered normally require a strong application of heat for a longer period of time, often several hours to produce hardening. Therefore, because of this time-consuming preparation, they are hardly useful for a multitude of purposes, for instance as for protectively coating larger objects, and areas.

It has nevertheless been shown that mixtures of two or more reactive components can still be nevertheless worked without too long a period of time for producing proper hardening by proportionally decreasing the application of heat when suitable hardeners in powder form are mixed with powder-forming resins. On the one hand, hardeners may be employed which produce no noticeable reaction upon mixture with the powder-forming reactive components in a cold state but which on the other hand initiate the reaction upon slight application of heat and upon further heating can cause the resins to become completely reacted.

In this manner it is possible, for example, to carry the powder mixture in any mechanical expedient well known to those skilled in the art as, for example, a commercially available flame-throwing spray gun, wherein the reaction begins upon melting of the reactive components. The granular mixture is controlled at a normal temperature since the reactive components affect each other only at their granular borders, none producing an exothermic reaction.

The following examples may be considered as stable hardeners for epoxy resins:

Stable aliphatic, aromatic or heterocyclic amines as, for example, hexamethylenediamine, dicyandiamide, phenylenediamine, and their derivatives, amine adducts and similar compounds such as polyamide powder and stable acid anhydrides as for example phthalic acid anhydride.

Similarly pulverized phenolic resins or polyesters may be employed in combination with the above-mentioned stable hardeners. Further, powdered filling materials, such as stone powder, abestine, slate dust, barium sulfate and powdered quartz; pigments, such as red oxide of iron and titanium dioxide; fluxing agents; as well as catalysts, such as lamp black and silica which influence the reaction temperature may also be employed within the scope of the present invention.

According to the inventive concept of the present invention, the manner in which the temperature of the mixture progresses may be either randomly or spasmodically; however, in any event, no precise or exact manner is necessary in order to produce the product of the present invention as described herein. The mixture may be carried cold and afterwards heated at the desired location of coating application. The application of heat may be predetermined in any desired manner dependent upon the mechanical expedient used for conveying the material. Since the danger of swelling of the applied reactive material is negligible it may be deposited in a single operation as thick layers in the usual manner. The process of the present invention is not only suitable for the preparation of protective layers but also may be employed for the preparation of freely formed creations of all kinds as, for example, lid closures, gaskets, sealings. The accompanying drawing is a flow sheet illustrating the subject-matter of the present invention.

The following examples illustrate one method of carrying out the novel concept of the present invention.

*Example 1*

100 parts by weight of the condensation product (molecular weight 1400) [1] from diphenylolpropane and epichlorhydrin are pulverized and mixed with 10 parts by weight of water-free hexamethylenediamine powder. The mixture may be deposited in and sprayed out of such expedient as a normal flame-throwing spray gun to produce quick-hardening colorless protective layers.

*Example 2*

1 kg. of the condensation product (molecular weight 900) [2] in pulverized form from diphenylolpropane and epichlorhydrin is thoroughly mixed with 250 g. m-phenylenediamine. The powder mixture is spread upon the exposed surfaces and melted upon the application of heat and hardened. In this manner, slightly brownish, durable protective layers are produced.

[1] 0.1 mol epoxyd on 100 g. resin.
[2] 0.2 mol epoxyd on 100 g. resin.

Example 3

3 parts by weight of the condensation product (molecular weight 3800)[3] from diphenylolpropane and epichlorhydrin is mixed with 1 part by weight of a stable amine adduct (M.P. approx. 90° C.). 4 parts by weight of red iron oxide is added. Spraying the mixture from a commercially available flame-throwing spray gun produces reddish brown protective layers of desirable chemical properties.

An important advantage of the present invention is that the improved protective coating material will have longer life resulting in economy of replacement and maintenance as well as a completely negligible increase in manufacturing costs.

The process has also proved very satisfactory for making protective coating material in the immediate area since it can be made and applied as it is needed and used on the spot without the necessity of providing additional equipment.

The foregoing description of specific illustrations is for the purpose of exemplification only and it is desired that the present invention be not limited to the exact details shown and described, for obvious modifications will occur to persons skilled in the art.

It is to be understood therefore that the present invention is not restricted to any specific preparations, procedures or ingredients described hereinabove, but includes all such variations, modifications and equivalents as fall within the scope of the appended claims.

What is claimed is:

1. The process for preparing protective coatings, which comprises the steps of pulverizing the condensation product formed from diphenylolpropane and epichlorhydrin, mixing it in cold state with a pulverulent hardening agent, and heat-spraying the mixture upon an exposed surface, whereby the mixture melts during the spraying to form a quick hardening protective layer.

2. The process for preparing protective coatings, which comprises the steps of pulverizing the condensation product formed from diphenylolpropane and epichlorhydrin, mixing it in cold state with a hardener selected from the group consisting of hexamethylene diamine and m-phenylenediamine, and heat-spraying the mixture upon an exposed surface, whereby the mixture melts during the spraying to form a quick hardening protective layer.

3. The process for preparing protective coatings, which comprises the steps of pulverizing the condensation product formed from diphenylolpropane and epichlorhydrin, mixing it in cold state with m-phenylenediamine and heat-spraying the mixture upon an exposed surface, whereby the mixture melts during the spraying to form a quick hardening protective layer.

4. The process for preparing protective coatings, which comprises the steps of pulverizing the condensation product formed from diphenylolpropane and epichlorhydrin and having a molecular weight of 1400, mixing 100 parts by weight thereof with 10 parts by weight of water-free hexamethylenediamine powder and heat-spraying the mixture upon an exposed surface, whereby the mixture melts during the spraying to form a quick hardening protective layer.

5. The process for preparing protective coatings, which comprises the steps of pulverizing the condensation product formed from diphenylolpropane and epichlorhydrin and having a molecular weight of 900, mixing 1 kg. thereof with 250 grams of m-phenylenediamine, and heat-spraying the mixture upon an exposed surface, whereby the mixture melts during the spraying to form a quick hardening protective layer.

6. The process for preparing protective coatings, which comprises the steps of pulverizing the condensation product formed from diphenylolpropane and epichlorhydrin and having a molecular weight of 3800, mixing 3 parts by weight thereof with 1 part by weight of an amine adduct having a melting point of approximately 90° C., adding 4 parts by weight of red iron oxide to the mixture, and heat-spraying the resulting mixture upon an exposed surface, whereby the mixture melts during the spraying to form a quick hardening protective layer.

References Cited in the file of this patent

UNITED STATES PATENTS

| Number | Name | Date |
|---|---|---|
| 941,605 | Baekeland | Nov. 30, 1909 |
| 1,098,608 | Aylsworth | June 2, 1914 |
| 1,102,632 | Aylsworth | July 7, 1914 |
| 1,111,286 | Aylsworth | Sept. 22, 1914 |
| 1,137,374 | Aylsworth | Apr. 27, 1915 |
| 1,218,146 | Wiechmann | Mar. 6, 1917 |
| 2,631,138 | Dannenberg | Mar. 10, 1953 |
| 2,643,243 | Dannenberg | June 23, 1953 |
| 2,788,337 | Preiswerk et al. | Apr. 9, 1957 |
| 2,821,487 | Hummel | Jan. 28, 1958 |

---

[3] 0.025 mol epoxyd on 100 g. resin.